Dec. 30, 1969　　　　　A. M. FRISCH　　　　　3,487,314
RADIO RECEIVING AND DISPLAY APPARATUS
Filed Dec. 6, 1966　　　　　　　　　　　　　　2 Sheets-Sheet 2
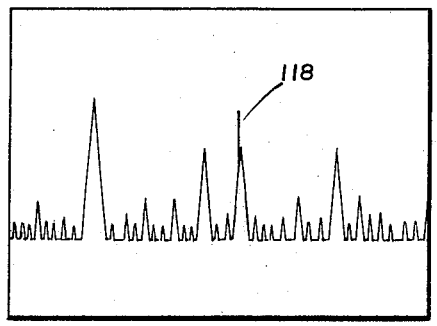
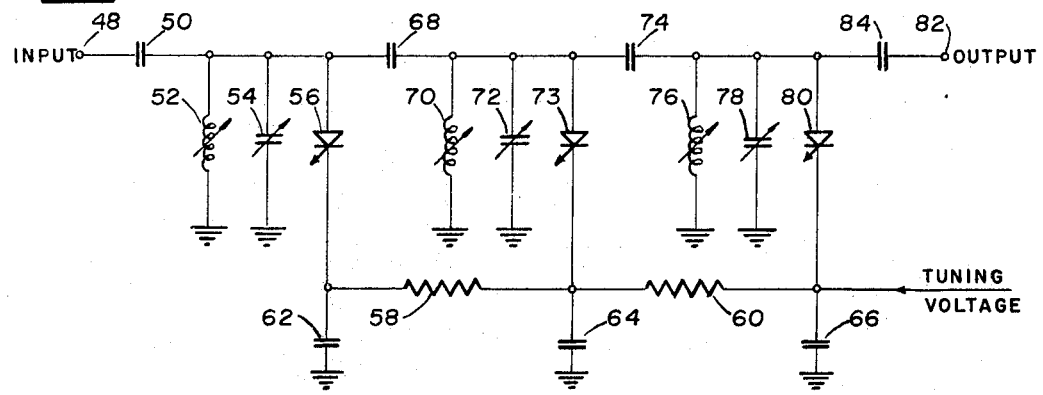
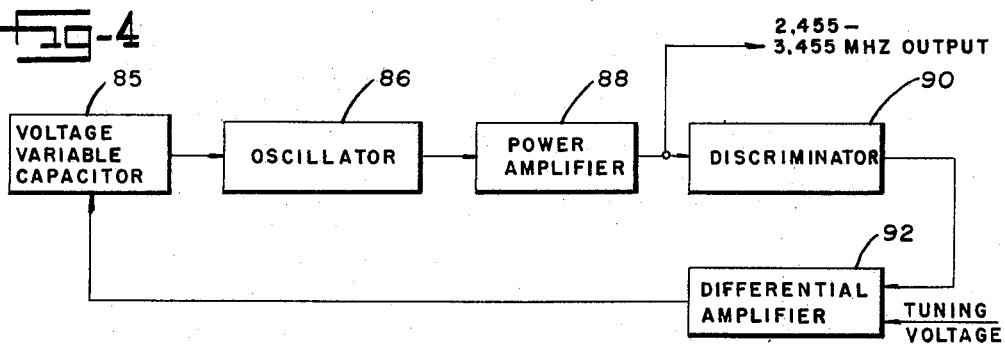
INVENTOR.
Arnold M. Frisch
BY
BUCKHORN, BLORE, KLARQUIST & SPARKMAN
ATTORNEYS United States Patent Office 3,487,314
Patented Dec. 30, 1969

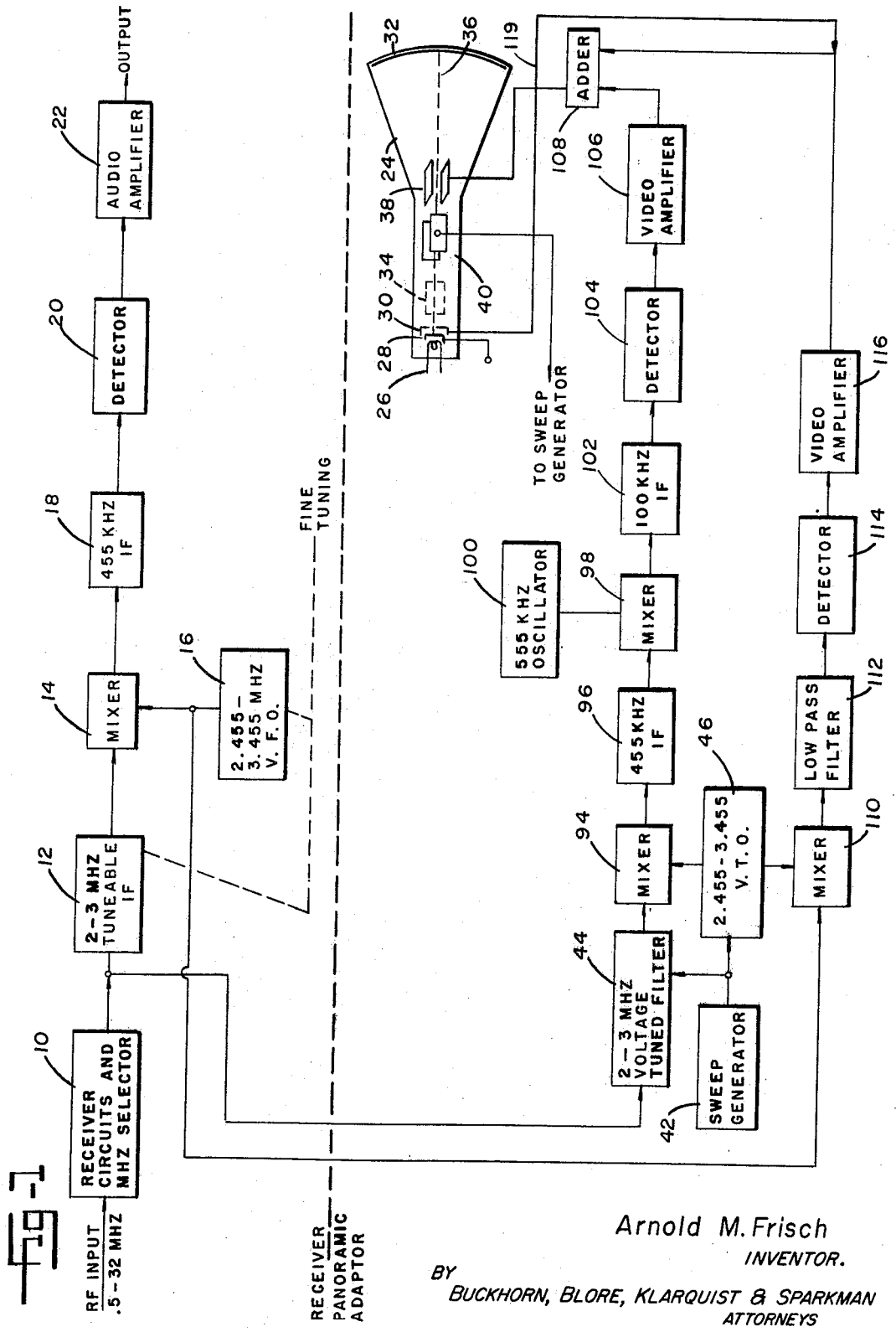

3,487,314
RADIO RECEIVING AND DISPLAY APPARATUS
Arnold M. Frisch, Beaverton, Oreg., assignor to Tektronix, Inc., Beaverton, Oreg., a corporation of Oregon
Filed Dec. 6, 1966, Ser. No. 599,595
Int. Cl. H04b 1/36
U.S. Cl. 325—363      10 Claims

ABSTRACT OF THE DISCLOSURE

A panoramic adapter is substantially continuously and repetitively tuned through a frequency spectrum of a receiver, and a visual display of this spectrum is presented on a cathode ray tube. When the panoramic adapter sweeps through the particular frequency to which the receiver is tuned, coincidence is detected, and an indication is added to the cathode ray tube display for accurately indicating the frequency or signal within the spectrum to which the receiver is tuned.

---

This invention relates to radio receiving and display apparatus and particularly to such an apparatus for accurately portraying signal information to which a receiver is tuned.

Panoramic adapter devices have been employed heretofore for visually displaying a frequency spectrum including the frequency to which a receiver apparatus is tuned. Some visual assistance is thereby given the operator of the receiver for tuning in a particular signal or for most advantageously separating a desired signal from an undesired signal. Heretofore, such display apparatus conventionally traced a waveform corresponding to an intermediate frequency spectrum in the receiver, together with such signal components as may be found within this I.F. spectrum. The frequency to which the receiver is tuned might, for example, correspond to the mid-frequency of this I.F. frequency spectrum as indicated on the display by a central hairline or other mechanical marker. Unfortunately, such a method of display is inaccurate and does not necessarily indicate the exact frequency or signal to which the receiver is tuned because of problems of mechanical and electronic misalignment.

It is therefore an object of the present invention to provide an improved receiving and display apparatus for accurately and consistently indicating the frequency to which a receiver is tuned within a displayed frequency spectrum.

Another object of the present invention is to provide an improved radio receiving and display apparatus wherein the indication of the frequency to which a receiver is tuned is fully automatically displayed and does not require frequent adjustment of the apparatus.

It is another object of the present invention to provide an improved receiving and display apparatus for displaying a radio frequency spectrum and electronically indicating on said display the frequency to which the receiver is tuned.

Briefly, in accordance with the present invention, a radio receiving and display apparatus including a display means, for example a cathode ray tube, for providing a visual trace along a time base representative of a given frequency spectrum and including the frequency to which the reeciver is tuned. This display is achieved by intermittent or periodic repetition of the trace with respect to time. For instance, a horizontal time base trace may be provided for a cathode ray tube and may be employed to represent frequency while vertical displacement from the horizontal time base is representative of signals occurring within the frequency spectrum displayed. Then, as this base is traced, an indication is added to the display at substantially the exact time the trace passes through a point representative of the frequency to which the receiver is tuned.

In accordance with one embodiment of the present invention, a sweep generator is connected to produce a horizontal sweep on a cathode ray tube and the same sweep generator produces a sweep in the frequency to which signal input tuning means in the panoramic adapter is tuned. Then detection means ascertains the time when such tuning means in the panoramic adapter is tuned to the same frequency as tuning means in the receiver. At this time, an indication marker is added electronically to the cathode ray tube trace. For example, a vertical marker may be added to the trace when such trace passes through the receiver frequency, or alternatively the intensity of the trace may be increased or otherwise changed so as to give an indication of the receiver frequency.

Since no mechanical adjustment is involved and since the indication of the receiver frequency is electronically detected and electronically provided on the trace, the present apparatus is not subject to problems of parallax, misalignment or drift. The indication or marker on the frequency spectrum display will reliably occur when such display passes through the frequency to which the receiver is tuned.

The subject matter which I regard as my invention, is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is a schematic diagram of a radio receiving and display apparatus according to the present invention;

FIG. 2 is an illustration of a display provided by the FIG. 1 apparatus;

FIG. 3 is a schematic diagram of a voltage tuned filter employed with the FIG. 1 apparatus; and FIG. 4 is a schematic diagram of a voltage tuned oscillator employed with the FIG. 1 apparatus.

Referring to FIG. 1, a receiver includes input circuits and megahertz selector, 10, for receiving radio input signals which, in this example, fall in the range between .5 and 32 megahertz. This input portion of the receiver provides an intermediate frequency broadband output spectrum extending from 2 to 3 megahertz for application to a tuneable intermediate frequency amplifier 12. This spectrum is derived in unit 10 in superheterodyne fashion from a selectable portion of the input frequency range. Amplifier 12 is tuneable across the aforementioned 2 to 3 megahertz spectrum.

Mixer 14 receives one of its inputs from amplifier 12 and a second input from variable frequency oscillator 16, the output of which is variable between 2.455 and 3.455 megahertz. A ganged fine tuning means is operably connected both to the variable frequency oscillator 16 and tuneable intermediate frequency amplifier 12 as indicated by dashed lines on the drawing. As will be understood by those skilled in the art, the difference frequency between the frequencies received from unit 12 and unit 16 is generated in mixer 14 and this difference is then applied to the 455 kilohertz second intermediate frequency amplifier 18. Detector 20 receives the output of the mixer, rectifies the same, and drives an audio or video frequency amplifier 22, the latter supplying the output signal to a loudspeaker or other utilization device.

The panoramic adapter portion of the FIG. 1 circuit includes a cathode ray tube 24 having a filament, 26, a cathode 28 and control grid 30 forming a part of the tube's electron gun. An electron beam 36, emitted from cathode 28, is directed towards light emitting phosphor 32 at the opposite end of the tube through focusing structure 34. Intermediate the electron gun and the phosphor or display end of the tube, the electron beam 36 is deflected in a vertical direction by means of vertical deflection plates 38 and in a horizontal direction by means of horizontal deflection plates 40. The cathode ray tube comprises an example of panoramic adapted display means according to the present invention.

Horizontal deflection plates 40 receive their input from a sweep generator 42 which is arranged to apply a sawtooth voltage waveform to the horizontal deflection plates whereby electron beam 36 periodically traces across the phosphor 32. The sweep generator 42 also provides outputs to a voltage tuned filter 44 having a frequency range between 2 and 3 megahertz, and a voltage tuned oscillator 46 having a frequency range between 2.455 and 3.455 megahertz. The voltage tuned filter is illustrated in greater detail in FIG. 3, while the voltage tuned oscillator is similarly illustrated in greater detail in FIG. 4.

Referring to FIG. 3, the voltage tuned filter receives its input at terminal 48 which is coupled through capacitor 50 to a combination shunt element including variable inductance 52 and variable capacitance 54, both being returned to ground. Also connected to the ungrounded junction of elements 52 and 54 is a varactor or variable capacitance diode 56 having its remote terminal coupled to a tuning voltage input derived from the sweep generator 42 (in FIG. 1) via decoupling resistors 58 and 60. Capacitors 62, 64 and 66 are bypass capacitors which enhance the decoupling between various sections of the filter. The tuning voltage, derived from sweep generator 42, acts to change the capacitance of varactor or variable capacitor 56 and thereby change the frequency to which the parallel combination of inductance 52, capacitor 54 and varactor 56 is tuned. As the tuning voltage is smoothly changed, the parallel circuit formed by these three elements is smoothly tuned through a frequency range.

The voltage tuned filter further includes coupling capacitor 68 for coupling the output of the first portion of the filter to a second filter section including shunt variable inductance 70 and shunt variable capacitance 72 in parallel with varactor diode 73. The remote terminal of the varactor diode is connected to the junction of resistors 58 and 60. A coupling capacitor 74 couples this second filter section to a third filter section comprising variable inductance 76, shunt variable capacitance 78, and varactor diode 80, the remote end of the latter being connected to the aforementioned tuning voltage. The output of the circuit is provided at a terminal 82 via coupling capacitor 84 from the third filter section. The second and third filter sections operate in the same manner as the first to enhance the overall frequency selectivity of the filter. The voltage tuned filter is, in this example tuneable between 2 and 3 megahertz, or over the broadband frequency spectrum output of unit 10 in the receiver.

Referring to FIG. 4, a voltage tuned oscillator (unit 46 from FIG. 1) also receives a tuning voltage from sweep generator 42 to control the frequency thereof. In this example the frequency of oscillation is varied between 2.455 megahertz and 3.455 megahertz. The voltage tuned oscillator includes a voltage variable capacitor or varactor 85 which is included in the tuned circuit of an oscillator 86 in a manner for changing the frequency thereof. The output of oscillator 86 is delivered to power amplifier 88 which amplifies the output of the voltage tuned oscillator. Such output also drives discriminator 90, the latter producing an output the voltage of which smoothly varies with the frequency to which oscillator 86 is tuned. The output of discriminator 90, as well as the tuning voltage from the sweep generator, are both applied to differential amplifier 92. The output of amplifier 92 in turn controls voltage variable capacitor 84 and thereby changes the frequency of the oscillator.

The discriminator output and the tuning voltage are combined in differential amplifier 92 in a manner such that if the tuning voltage cause the frequency of the oscillator to shift too rapidly with voltage, then the output of discriminator 90 in effect will subtract therefrom to provide a more linear frequency change of frequency with voltage. Similarly, should the tuning voltage vary the frequency of the oscillator less than the amount desired, the discriminator output forces a greater change in oscillator frequency. The oscillator loop operates in a manner to produce a smooth and substantially linear change in output frequency in accordance with the sawtooth tuning voltage from the sweep generator as applied thereto.

Returning to FIG. 1, the outputs of both voltage tuned filter 44 and voltage tuned oscillator 46 are applied to a mixer 94 wherein the difference between the two is established and applied to 455 kilohertz intermediate frequency amplifier 96. Amplifier 96 in turn drives mixer 98 in conjunction with 555 kilohertz oscillator 100. Thus an intermediate frequency of 100 kilohertz is produced in mixer 98 and applied to 100 kilohertz intermediate frequency amplifier 102. The additional conversion results in better resolution for the viewing device. Amplifier 102 drives detector 104 and the latter provides an input to video amplifier 106 for driving the vertical plates 38 of the cathode ray tube 24 by way of adder 108.

As sweep generator 42 establishes a horizontal trace of the electron beam across the phosphor of the cathode ray tube 24, the same sweep voltage, from the sweep generator, tunes elements 44 and 46 to provide a smooth concurrent change in the frequency to which the input of the panoramic adapter is tuned. the input portion of the panoramic adapter, including units 44, 46 and mixer 94, comprises a frequency selective means for thus sweeping the input to the cathode ray display device through at least a portion of the receiver frequency spectrum. Each time the trace of the electron beam repetitively occurs, the frequency selective means sweeps through the received spectrum and provides an output applied to vertical plates 38. As a result, a display of this spectrum, including vertical deflection corresponding to received signals, will be provided on the phosphor screen of the cathode ray tube. A representation of this display is illustrated in FIG. 2. Various signals occurring within the frequency spectrum are indicated by vertical displacements of varying size on the horizontal trace.

The panoramic adapter also includes a second channel for providing an indication or marker of the frequency to which the latter stages of the receiver circuit are actually tuned, such tuning having been accomplished by means of the fine tuning control indicated by dashed lines interconnecting units 12 and 16 on the drawing. The output of variable frequency oscillator 16 in the receiver is applied to a mixer 110 in the panoramic adapter which also receives an input from voltage tuned oscillator 46. As understood by those skilled in the art, the frequencies of these local oscillators primarily determine the frequencies to which the receiver and adapter are respectively tuned. When the frequency of variable frequency oscillator 16 and voltage tuned oscillator 46 are substantially the same, mixer 110 will produce a low frequency difference signal, such difference being zero when the frequencies to which units 16 and 46 are tuned are identical. The output of mixer 110 is applied to low pass filter 112 which in turn provides an input for detector 114 in cascade with video amplifier 116. The low pass filter forms a frequency limited output means for providing an output only at such time as the mixer output falls within a very low frequency range, or at a time when the frequencies of units 16 and 46 are substantially equal. When the frequencies of units 16 and 46 are equal, the receiver and adapter are instantaneously tuned to the same frequency. Therefore, each time the cathode ray tube display means traces through the frequency spectrum, an output from video amplifier 116 will occur when the display means traces across the frequency to which the receiver fine tuning is tuned. A visual indication is then initiated relative to the signal or frequency on the display to which the receiver is tuned. This indication is exact and involves no mechanical parallax problems nor mechanical or electrical non-linearity between circuits or devices.

The output of video amplifier 116 is suitably applied to adder 108 and therefore a vertical frequency marker will be added to the trace of the cathode ray tube when such trace passes through the frequency to which the receiver is tuned. The resulting display as illustrated in FIG. 2 includes such marker at 118. Alternatively, the output of video amplifier 116 may suitably be coupled to the control grid 30 of the cathode ray tube via the alternative connection 119, indicated on the drawing. The indication will then be a point of increased or decreased intensity on the cathode ray tube trace when the frequency to which the receiver is tuned is passed over.

While I have shown and described a preferred embodiment of my invention, it will be apparent to those skilled in the art that many changes and modifications may be made without departing from my invention in its broader aspects.

I claim:
1. Radio receiving and display apparatus comprising:
  a tuneable receiver,
  display means for providing a trace through a frequency range of said receiver, including means for substantially continuously tuning through said frequency range and displaying signals received, and
  means for detecting when the display means and the receiver are tuned to the same frequency and for electronically providing an indication added to said display relative to said trace only at times when said display traces through the frequency to which said receiver is tuned.
2. Radio receiving and display apparatus comprising:
  a radio receiver capable of receiving a radio frequency spectrum while also being tuneable within said spectrum,
  electronic display means for graphically displaying a waveform along a time base corresponding to the said frequency spectrum and including such radio signals as occur within said spectrum,
  frequency selective means interposed between said receiver and said display means for smoothly varying the frequency of input to said electronic display means with said time base,
  means for detecting the precise instant when said frequency selective means is tuned to the same frequency as the said receiver, and
  means for adding an indication to said display when the frequency of said frequency selective means is equal to the frequency within said spectrum to which said receiver is tuned and at a location in said display related to the point in said time base indicative of such frequency.
3. Radio receiving and display apparatus comprising:
  a radio receiver capable of simultaneously receiving a frequency spectrum within a given frequency range while also being tuneable within such range to a selected radio signal at a selectable frequency,
  cathode ray tube display means receiving its input from said receiver and including means for emitting an electron beam and deflecting the same to produce a display trace visually representing at least a portion of the said frequency spectrum received by said receiver including radio signals received within such frequency spectrum,
  said display means further including frequency selective means for repetitively sweeping the input of said display means from said receiver through at least a portion of said frequency spectrum to consecutively produce visual components of said display representative of said spectrum,
  means receiving an input from said receiver and an input from said frequency selective means and for detecting the time during the sweep of said frequency selective means at which said frequency selective means provides an input to said display means substantially equal to the frequency to which said receiver is tuned, and
  means for adding an indication marker to the said display trace at the time when the frequency of said frequency selective means substantially equals the frequency to which said receiver is tuned, said marker thereby indicating such frequency on the display.
4. The apparatus according to claim 3 wherein said means for detecting comprises a mixer circuit receiving respective inputs from tuneable local oscillators in said receiver and in said frequency selective means to produce a low frequency output when the two are substantially equal, and frequency limited output means for providing an output to said means for adding an indication marker only when said low frequency output of said mixer is within a predetermined low frequency range.
5. The apparatus according to claim 4 wherein said frequency limited output means comprises a low pass filter.
6. The apparatus according to claim 3 wherein said electron beam and said cathode ray tube means is periodically swept horizontally and wherein said frequency selective means is swept in frequency in substantial synchronism with such horizontal display.
7. The apparatus according to claim 3 wherein the said indication marker is achieved by adding to the vertical deflection of said electron beam when the frequencies of said receiver and said frequency selective means are substantially equal.
8. The apparatus according to claim 3 wherein said marker is achieved by altering the intensity of said electron beam when the frequencies of said receiver and said frequency selective means are substantially equal.
9. The apparatus according to claim 3 including a sweep generator which is connected to provide horizontal sweep for said cathode ray tube electron beam and which is also connected to control the tuning of said frequency selective means including the local oscillator of said frequency selective means.
10. The apparatus according to claim 9 wherein said receiver and the said frequency selective means both include a local oscillator and wherein said means for detecting the time at which said frequency selective means provides an input to said display means substantially equal to the frequency to which said receiver is tuned comprises a mixer circuit to which the respective outputs of said local oscillators are provided, said apparatus further comprising frequency limited output means for initiating the indication marker only when the output of said mixer is within a predetermined low frequency range.

References Cited

UNITED STATES PATENTS 3,241,064   3/1966   Bartels _____ 325—335 XR

KATHLEEN H. CLAFFY, Primary Examiner

B. P. SMITH, Assistant Examiner

U.S. Cl. X.R.

325—337